O. A. KNOPP.
ELECTRIC CURRENT MEASURING INSTRUMENT.
APPLICATION FILED FEB. 7, 1911.
1,015,192.
Patented Jan. 16, 1912.
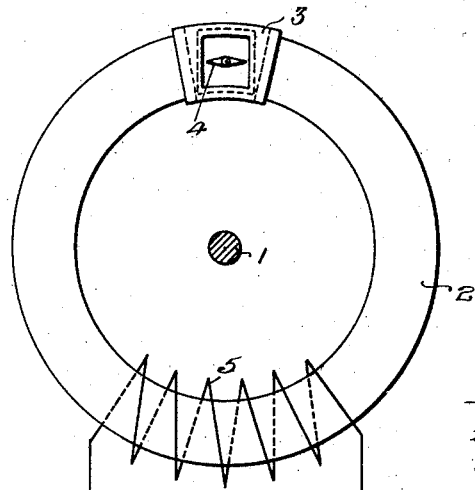
Fig. 1.
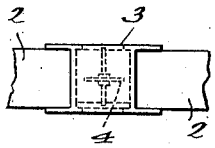
Fig. 4.
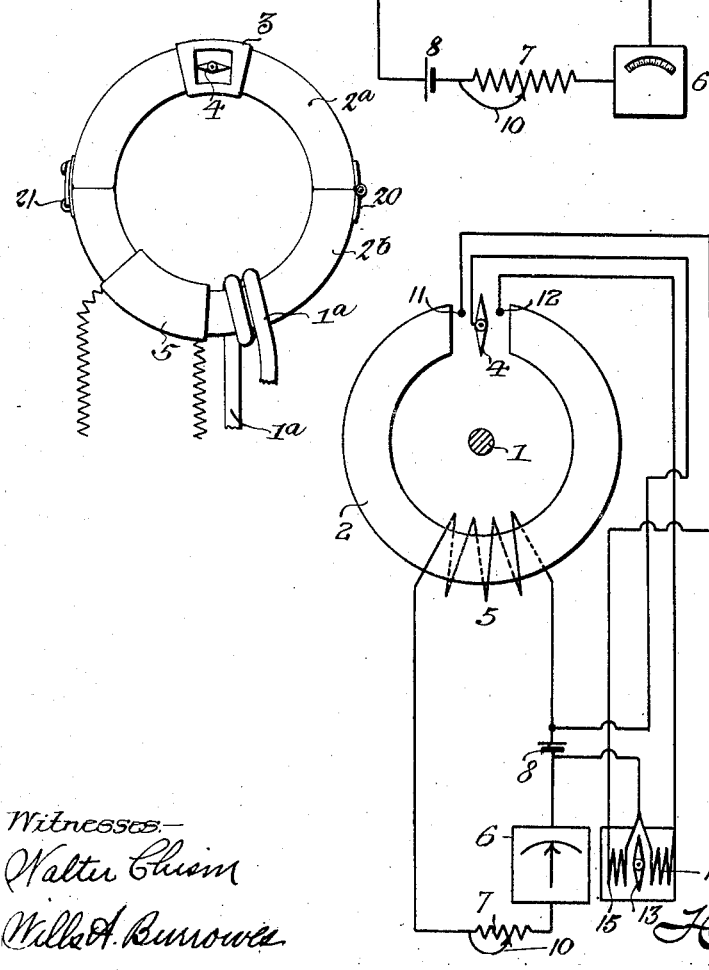
Fig. 3.
Fig. 2.
Witnesses—
Walter Chism
Willa A. Burrowes
Inventor—
Otto A. Knopp.
by his Attorneys—
Howson + Howson

UNITED STATES PATENT OFFICE.

OTTO A. KNOPP, OF OAKLAND, CALIFORNIA.

ELECTRIC-CURRENT-MEASURING INSTRUMENT.

1,015,192.   Specification of Letters Patent.   Patented Jan. 16, 1912.

Application filed February 7, 1911. Serial No. 607,077.

*To all whom it may concern:*

Be it known that I, OTTO A. KNOPP, a subject of the Emperor of Germany, and a resident of Oakland, Alameda county, California, have invented certain Improvements in Electric-Current-Measuring Instruments, of which the following is a specification.

One object of my invention is to provide an instrument particularly designed for measuring the current flowing in a conductor forming part of a direct current circuit, which shall be of such a construction as will permit of its use without requiring the cutting of said conductor or the opening of the circuit in which it is included.

I further desire to provide a current measuring instrument of the general type above noted which shall be of such construction as will permit of its remaining permanently in operation and which may, if desired, have its parts so arranged as to give its indications at some point distant from that part of the conductor at which it is desired to measure the current flow.

Another object of the invention is to provide a current measuring instrument which shall operate without consuming practically any of the energy of the circuit to which it is applied and which shall be of simple and substantial construction, as well as accurate under conditions of use.

These objects and other advantageous ends I secure as hereinafter set forth reference being had to the accompanying drawings, in which:—

Figure 1, is a front elevation to some extent diagrammatic, illustrating a simple form of my invention, Fig. 2, is a diagrammatic view illustrating my improved current measuring instrument as constructed to give its indications at a point distant from that at which it is applied to the conductor whose current flow is to be measured, Fig. 3, is a modified form of my invention, and Fig. 4 is a fragmentary plan showing the construction of a part of my invention.

In the above drawings, 1 represents a transverse section of a conductor in which flows the electric current to be measured, and 2 is a soft iron core in the shape of a ring but having its two ends spaced apart a sufficient distance to permit of the passage between them of the current conductor 1 with whatever insulation may surround the same. Removably mounted between the ends of the core 2 is a structure 3 preferably in the form of a small casing in which is pivotally or otherwise movably mounted a magnetic bar or needle 4; this latter being so supported that it is free to turn so as to lie parallel with the line joining the ends of the core or at right angles to such line. Upon the core 2 is wound a coil 5 of insulated wire connected in circuit with an ammeter 6, a variable resistance 7, and a source of current 8. When it is desired to utilize the device to measure the current flow in a conductor 1, the casing 3 is removed and the core 2 is slipped over said conductor so that this latter occupies an axial position relatively thereto with the pole faces substantially parallel to the magnetic meridian. Said casing is then replaced in the position shown in Fig. 1, and it is obvious that the current flowing in the conductor induces a flux in the said core which causes the magnet or needle 4 to assume the position illustrated. The battery or current source 8 is so connected that when the switch 9 is closed, the current flows through the coil 5 in such a direction as to tend to set up a flux in the core 2 opposing that set up by the current in the conductor 1 and by varying the amount of resistance 7 as by a sliding contact 10, the current flowing in the said coil may be brought to such a point that the flux set up by it will be exactly equal to that due to the current flow in the conductor 1. The current flow in the circuit which includes the coil 5, as indicated on the ammeter, when the flux set up by the current in the conductor has been neutralized, bears a definite relation to the current flow in said conductor, and by proper calibration the ammeter 6 may be made to give direct readings of such current flow. In order to indicate when the flux set up by the coil 5 is equal to that set up in the core 2 by the current in the conductor 1, observations are made of the magnet or needle 4 which will lie in a line at right angles to the line joining the ends of the core only under this condition.

If desired, means may be provided whereby the position of the bar or needle 4 may be indicated at a point distant from the core 2, and for this purpose I provide a pair of contacts 11 and 12 which may, if desired, serve as stops, one of them being engaged by the bar or needle 4 as long as there is any flux in said core 2. The bar or needle 4 with these two contacts is connected in circuit with a current source such as the battery 8 and also with an indicating instrument having a magnetized bar or needle 13 and two coils 14 and 15 operative thereon; the arrangement being such that the first of these coils is in series with the contact 11 while the second is in series with the contact 12. Each coil has one terminal connected to one terminal of the current source 8, while the needle or bar 4 is connected in circuit with the second terminal of said source. The design of the indicating instrument 13—14—15 is such that when the needle or bar 4 engages the contact 11, the needle or bar 13 is deflected from its central and normal position by reason of the current flow in the coil 15, so that it is caused to take up a position similar to that of said first bar or needle. Likewise when the needle 4 engages the contact 12, the coil 14 being energized, deflects the needle 13 into a corresponding position. When, however, by adjusting the variable resistance 7, the flux in the core 2 has been brought practically to zero as before described, the needle 4 takes up a position intermediate the contacts 11 and 12 as indicated in Fig. 2, while the needle 13 likewise takes up its normal or zero position, since neither of the coils 14 nor 15 is energized. By proper manipulation of the sliding contact 10, the current flow in the coil 5 may be slightly varied above and below that necessary to completely neutralize the flux in the core 2 due to the current in the conductor 1, so that the needle 4 may be made first to engage with the contact 11, and then with the contact 12, until at last the current flow in said coil is brought to such a point that both the needles 4 and 13 occupy their mid positions, whereupon, as before, the reading of the ammeter 6 is taken. This, as previously explained, is proportional to the current flow in the conductor 1, which may be obtained either directly from said ammeter or by calculation from the reading thereof.

It is understood that in the case of the apparatus shown in Fig. 2 the needle or bar 4 together with its contacts 11 and 12 are properly mounted in a case or supporting structure such as that shown in Fig. 1 in order to permit of their removal from the core 2 when it is desired to place this around a conductor whose current flow is to be measured.

Should it prove desirable to have the indicating needle or bar 4 and its mounting permanently attached to the core 2, this latter may be made in two parts detachably connected together so as to permit of the introduction of the conductor 1 without requiring the removal of said needle 4 or its mounting. With this idea in view the device may be made as shown in Fig. 3, with the core 2 in two parts 2ª and 2ᵇ connected by a hinge 20 and locked together under conditions of use by a latch 21. As is obvious, these two halves may be separated to permit of the introduction of the conductor 1.

The same method of measuring a current without breaking the circuit in which it is flowing, may be employed if the conductor 1 is permanently mounted on the core 2, as for example by being given one or more turns around the same, as indicated at 1ª in Fig. 3. It is understood that such an arrangement of parts is particularly adaptable for the nonportable forms of my invention, although it is by no means confined to the same, and in any case, however, the apparatus is manipulated as heretofore described, in order to ascertain the quantity of current flowing through the conductor 1.

I claim:—

1. A current measuring instrument consisting of an annular core having ends spaced apart to permit of the introduction of a current carrying conductor; a device for indicating the presence of flux in said core; a winding for the core; means in circuit with the winding for causing a current flow therein; and means for indicating the amount of said current.

2. A current measuring instrument consisting of an annular core having its ends spaced apart to permit of the introduction of a current carrying conductor capable of causing a flux to be set up in said core; current actuated means for neutralizing the flux set up in the core by the current in said conductor; and means for measuring the current necessary to cause such neutralization of the flux.

3. A current measuring instrument consisting of an annular core having ends spaced apart to permit of the introduction of a conductor carrying a current capable of setting up a flux in said core; a device for indicating the presence of a flux in said core; means for setting up a flux in said core in opposition to that produced by the conductor within the same; and means for indicating the amount of current necessary to produce said opposing flux.

4. A current measuring instrument consisting of a core; a device for indicating the presence of a flux in said core; a conductor carrying a current to be measured and in position to cause a flux to be set up in the core; a winding on the core; current varying means and a current measuring instrument in circuit with the said winding; and a source of current connected to produce a flux in the core opposed to that set up therein by the current to be measured.

5. A current measuring instrument consisting of an annular core concentric with the conductor whose current is to be measured; said current being capable of setting up a flux in said core; a device for indicating the presence of flux in said core; a winding on the core; means for producing a current in the winding in order to set up a flux in the core opposed to that set up by the current in the conductor; with a device for indicating the amount of current flowing through the winding when said two fluxes are equal.

6. A current measuring instrument consisting of an annular core substantially concentric with a conductor whose current is to be measured; said current being capable of setting up a flux in said core; a device for indicating the presence of flux in said core; a winding on the core; with a rheostat, a battery, and an ammeter in circuit with said winding.

7. The combination in a current measuring instrument of an annular core having its ends spaced apart to permit of the introduction of a current carrying conductor whose current is to be measured; a flux indicating device removably mounted between said core ends; current actuated means for neutralizing the flux set up in the core by the current in said conductor; and means for measuring the current necessary to cause the neutralization of said flux.

8. The combination of a core having a winding and mounted adjacent a conductor whose current is to be measured; means for setting up in said winding a current flowing in a direction to set up a flux in the core opposed to that generated by the current in said conductor; a device for indicating the presence of flux in the core; means for measuring the amount of current flowing in the winding; and an instrument electrically connected to said flux indicating device for showing the position of its movable element.

9. A current measuring instrument consisting of a core mounted adjacent a conductor whose current is to be measured; means including a movable element for indicating the presence of flux in said core; an instrument electrically connected to said flux indicator for indicating at a distance the position of its movable element; a winding for the core; means for energizing said winding to produce a flux in the core opposing that produced by the current to be measured; and means for measuring the current in the winding when the flux set up by the current to be measured is neutralized.

In testimony whereof, I have signed my name to this specification, in the presence of two subscribing witnesses.

OTTO A. KNOPP.

Witnesses:
E. M. SMITH,
N. W. QUINLAN.

---

Copies of this patent may be obtained for five cents each, by addressing the "Commissioner of Patents, Washington, D. C."